US008694831B2

(12) United States Patent
Arapov et al.

(10) Patent No.: US 8,694,831 B2
(45) Date of Patent: Apr. 8, 2014

(54) AUTOMATIC BUG REPORTING TOOL

(75) Inventors: Anton Arapov, Brno (CZ); Jiri Moskovcak, Brno (CZ); Zdenek Prikryl, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 353 days.

(21) Appl. No.: 12/475,410

(22) Filed: May 29, 2009

(65) Prior Publication Data
US 2010/0306593 A1 Dec. 2, 2010

(51) Int. Cl.
G06F 11/00 (2006.01)

(52) U.S. Cl.
USPC .......................................... 714/38.1

(58) Field of Classification Search
USPC .............................................. 714/38
See application file for complete search history.

(56) References Cited

U.S. PATENT DOCUMENTS

| | | | | |
|---|---|---|---|---|
| 6,266,788 B1 * | 7/2001 | Othmer et al. | ............. | 714/38.11 |
| 7,219,266 B2 * | 5/2007 | Glerum et al. | ............. | 714/38.11 |
| 7,739,551 B2 * | 6/2010 | Eickmeyer et al. | .......... | 714/38.1 |
| 7,788,537 B1 * | 8/2010 | Yellen et al. | ............... | 714/38.11 |
| 7,861,120 B2 * | 12/2010 | Cui | .............................. | 714/38.1 |
| 8,479,051 B2 * | 7/2013 | Yuan et al. | .................... | 714/38.1 |
| 2002/0112200 A1 * | 8/2002 | Hines | ............................... | 714/38 |
| 2003/0145255 A1 * | 7/2003 | Harty et al. | ..................... | 714/48 |
| 2004/0006546 A1 * | 1/2004 | Wedlake et al. | ................. | 706/46 |
| 2006/0136784 A1 * | 6/2006 | Prescott et al. | ................. | 714/38 |
| 2006/0200701 A1 * | 9/2006 | Callender | ........................ | 714/38 |
| 2006/0259899 A1 * | 11/2006 | Cooper et al. | ................. | 717/127 |
| 2007/0006037 A1 * | 1/2007 | Sarguisingh et al. | ............ | 714/38 |
| 2007/0011498 A1 * | 1/2007 | Shaffer et al. | ................... | 714/48 |
| 2007/0074169 A1 * | 3/2007 | Chess et al. | .................... | 717/126 |
| 2008/0201705 A1 * | 8/2008 | Wookey | ......................... | 717/175 |
| 2008/0263406 A1 * | 10/2008 | Prescott et al. | ................. | 714/38 |
| 2008/0307267 A1 * | 12/2008 | Chandrasekaran | ............. | 714/38 |
| 2011/0050872 A1 * | 3/2011 | Harbert et al. | .................. | 348/61 |

OTHER PUBLICATIONS https://fedorahosted.org/abrt/wiki/WikiStart?version=20 (updated on May 22, 2009 by dnovotny).*

* cited by examiner

Primary Examiner — Michael Maskulinski
Assistant Examiner — Neil Miles
(74) Attorney, Agent, or Firm — Lowenstein Sandler LLP

(57) ABSTRACT

An apparatus and a method for detecting and reporting malfunctions in computer programs is described. A malfunction detector detects at least one type of a software malfunction as defined in a configurable malfunction library. A data collector collects data of the software malfunction. A crash reporter reports the crash report in a manner specified in a configurable reporting library corresponding to the type of software malfunction to one or more remote computers.

15 Claims, 5 Drawing Sheets

AUTOMATIC BUG REPORTING TOOL

TECHNICAL FIELD

Embodiments of the present invention relate to computing systems, and more particularly, to error reporting in computer programs.

BACKGROUND

Software malfunction may still occur despite a software developer's efforts to eliminate errors from the software before it is placed on the market. To assist software developers in better identifying potential errors, commercially available software have been developed to collect information upon the occurrence of a program error. One example of such software creates a snapshot of a portion of the computer's memory at the time of a crash. The crash is an event that is usually prompted by an error. It prevents the further normal operation of the software and, depending upon the severity of the error, of the computer system itself. Users may be offered an opportunity to transmit the crash data to provide the manufacturer an opportunity to diagnose the cause of the error. The crash data can contain information to assist in identifying program errors.

However, such software is limited in how a crash is detected. The crash data is also limited to be sent to one particular destination—the software developer. Specifying how and what kind of information to gather, and where to send it to can be a daunting task for a non-power user or a user without any knowledge of debugging techniques.

BRIEF DESCRIPTION OF THE DRAWINGS

The present invention is illustrated by way of example, and not by way of limitation, in the figures of the accompanying drawings and in which.

DETAILED DESCRIPTION

Described herein is an apparatus and a method for detecting and reporting malfunctions in computer programs. In one embodiment, a malfunction detector detects at least one type of a software malfunction as defined in a configurable malfunction library. A data collector collects data of the software malfunction. A crash reporter reports the crash report in a manner specified in a configurable reporting library corresponding to the type of software malfunction to one or more remote computers.

Figure 1:
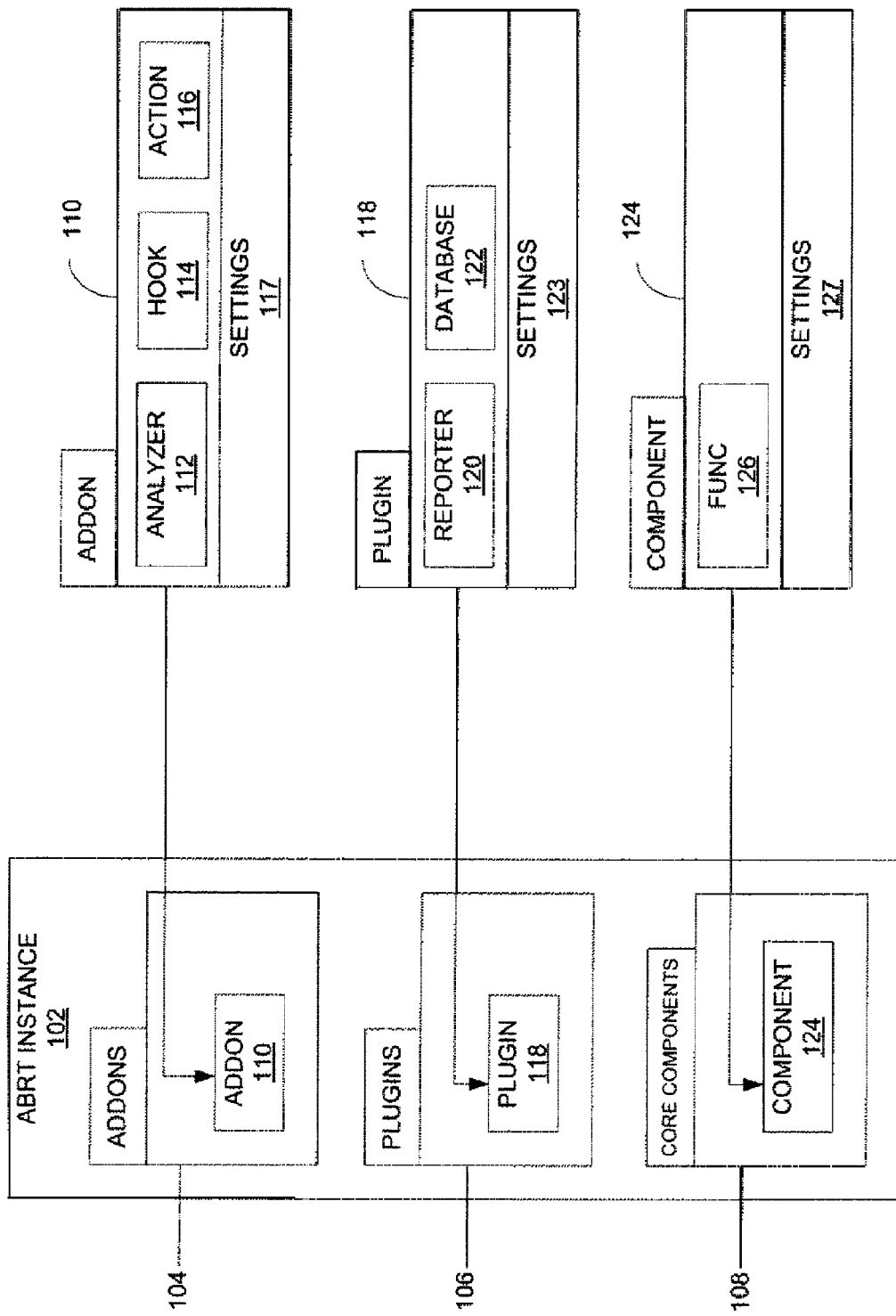
FIG. 1 is a block diagram illustrating one embodiment of a software malfunction reporting tool.

FIG. 1 is a block diagram illustrating one embodiment of a software malfunction reporting tool referred to as ABRT (Automatic Bug Reporting Tool). ABRT allows non-power uses with bug reporting. In particular, ABRT allows users to create bug reports with important information without any knowledge of debugging techniques making the process as easy as possible.

An ABRT instance 102 includes an addon module 104, a plugin module 106, and a core component module 108. Addon module 104 includes at least one addon component 110 that specifies how to detect a software malfunction. In one embodiment, addon component 110 includes one of an analyzer component 112, a hook component 114, or an action component 116, and a corresponding addon setting component 117. Addon component 110 operates to detect at least one type of a software malfunction as defined in a configurable malfunction library. Examples of addon component 110 include a C/C++ application crashes catcher, a Linux kernel crashes catcher, a Python applications crashes catcher, and a Run Application "Action".

Plugin module 106 includes at least plugin component 118. In one embodiment, plugin component 118 is configured to report a crash report in a manner specified in a configurable reporting library corresponding to the type of software malfunction to at least one remote computer. In another embodiment, plugin component 118 includes a storage for just keeping the information. In one embodiment, plugin component 118 includes one of a reporter component 120, or a database component 122, and a corresponding setting component 123. For example, database 122 includes a SQLite database storage. Examples of reporter component 120 include a report to the Bugzilla using XML-RPC, a report to kerneloops.org using HTTP POST, a report to a tile, a report by email, a report to an Operating System's system log, and a report by the FTP.

Core component module 108 includes at least one core component 124. In one embodiment, core component 124 includes a core function 126 and a core setting 127. Examples of core function 126 include GUI, Applet, TUI, and Daemon.

It should be noted that FIG. 1 illustrates one embodiment. The components illustrated in Addon component 110, Plugin component 118, and Core component 124 are optional. Setting files 117, 123, and 127 are also optional and enable sophisticated configurations of ABRT. Addon module 104 and Plugin module 106 are loaded on ABRT's start while Core module 108 is compiled-in feature.

Figure 2:
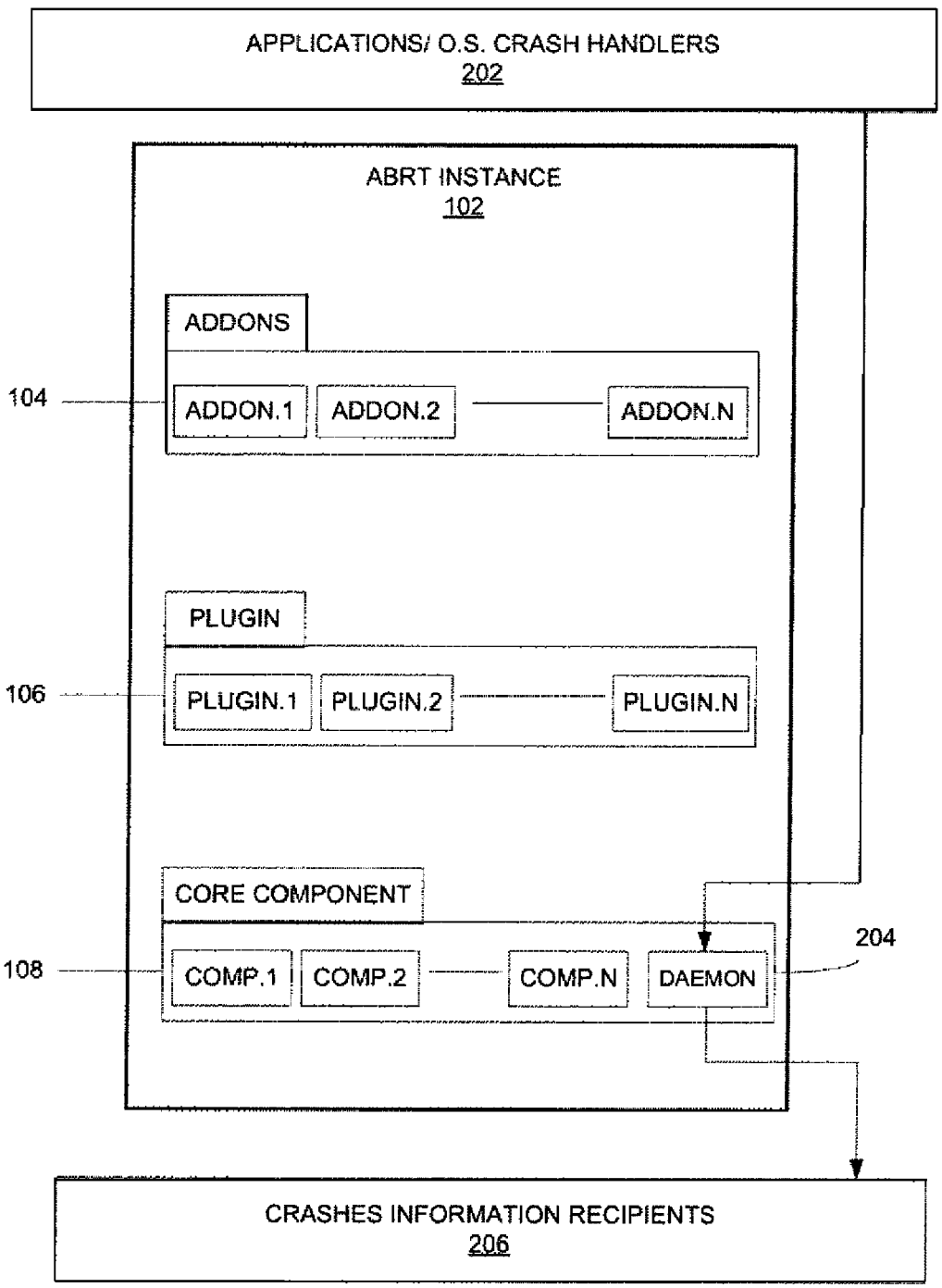
FIG. 2 is a block diagram illustrating one embodiment of an operation of a software malfunction reporting system.

FIG. 2 is a block diagram illustrating one embodiment of an operation of a software malfunction reporting system including the ARBT instance 102 as illustrated in FIG. 1. In particular, FIG. 2 illustrates a top level schema. Collected crash data is provided to daemon 204 which generates a crash report. In one embodiment, collected crash data is a result from applications/operating system crash handlers.

Examples of crash handlers includes but are not limited to:
Linux kernel crash;
C/C++ application crash;
Python application crash; and
any other kind of interceptable crash.

In another embodiment, application/os crash handlers 202 also include:
application debug bits installation and extracting debug information;
guiding user in order to solve the occurred problem or provide additional input;
getting 'snapshot' of the system configuration and state; and
any other task.

The crash report is generated and submitted to crashes information recipients 206. For example, crashes information recipients 206 include:
another ABRT instance;
saving the crash report to a database;
sending the report to a bug tracking software (e.g. Bugzilla server);
sending as an email to a predefined address;

sending as an SMS via a telecommunication network;
saving as a file to any kind of storage hardware;
sending crash reports over network using different protocols; and
sending to any other recipients.

Figure 3:
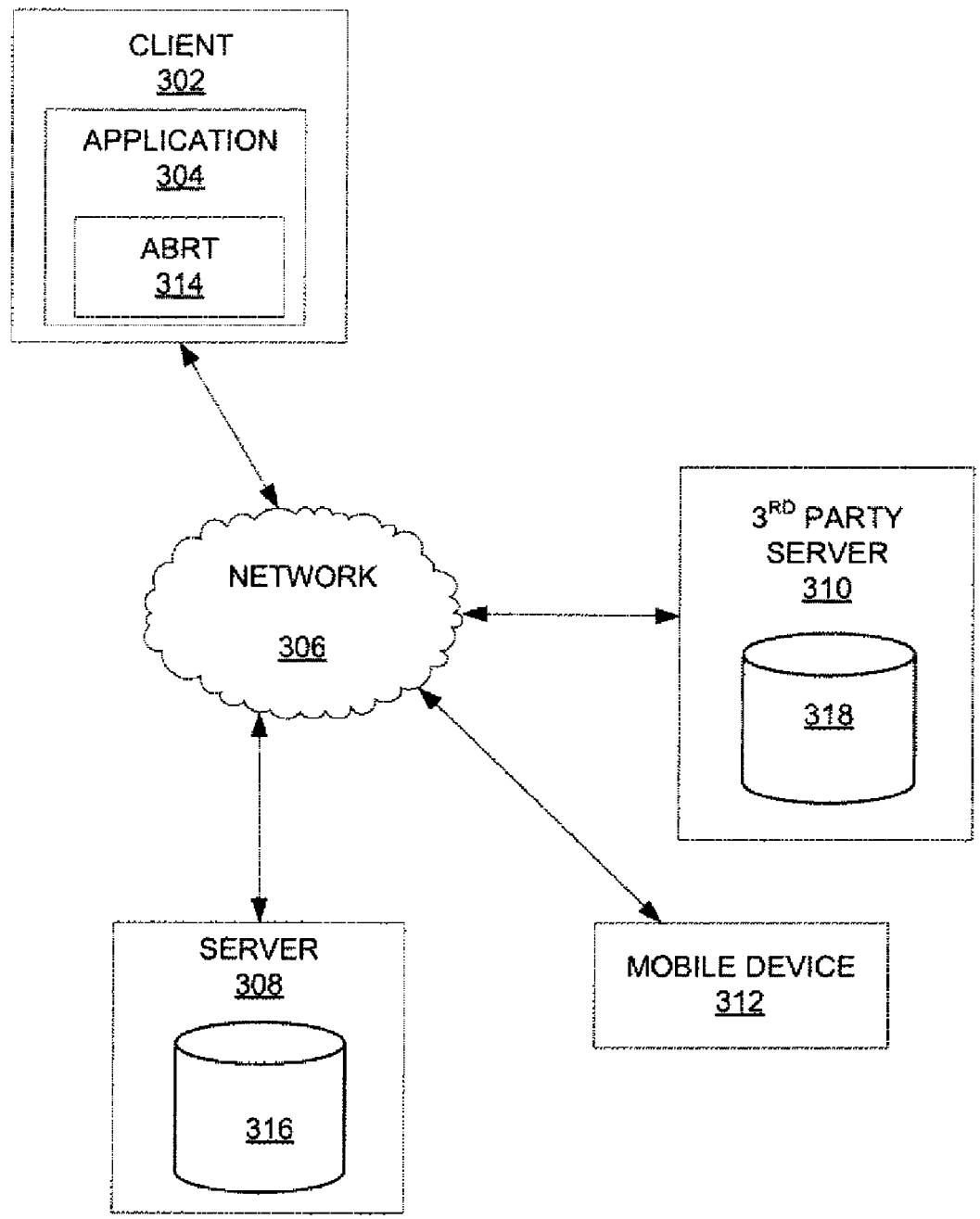
FIG. 3 is a block diagram illustrating one embodiment of a network system for reporting software malfunctions.

FIG. 3 is a block diagram illustrating one embodiment of a network system for reporting software malfunctions. A client 302 has an application 304 that includes an ABRT client tool 314 configured to communicate with an ABRT server side. Client 302 communicates with a server 308, a third party server 310, and a mobile device 312. Client 302 may communicate with at least one of the servers 308, 310, and mobile device 312. Each server 308, 310 includes a corresponding storage device 316, 318 for storing crash reports. The ABRT server side can reside with servers 308, 310, and mobile device 312

In one embodiment, storage can be centralized or decentralized. When the information about the software application crash/malfunction is received by storage 316, 318, it is classified (e.g. whether the problem occurred before, occurrence frequency, etc. . . . ) by ABRT server side logic. The crash data is kept there for further analysis by a human or a machine.

FIG. 3 illustrates that it is possible to have more than one ABRT server side consumer of the collected crash information at the same time. It is also possible to deliver the information to any kind of information consumers with different communication means (e.g. any of the networking protocols, simple e-mail, or sms message, etc. . . . ).

In one embodiment, ABRT can be configured to send the crash report to any specified destination not limited to a server associated with the software developer of application 304. For example, the crash report may be sent to a third party server 310 or any other server.

Figure 4:
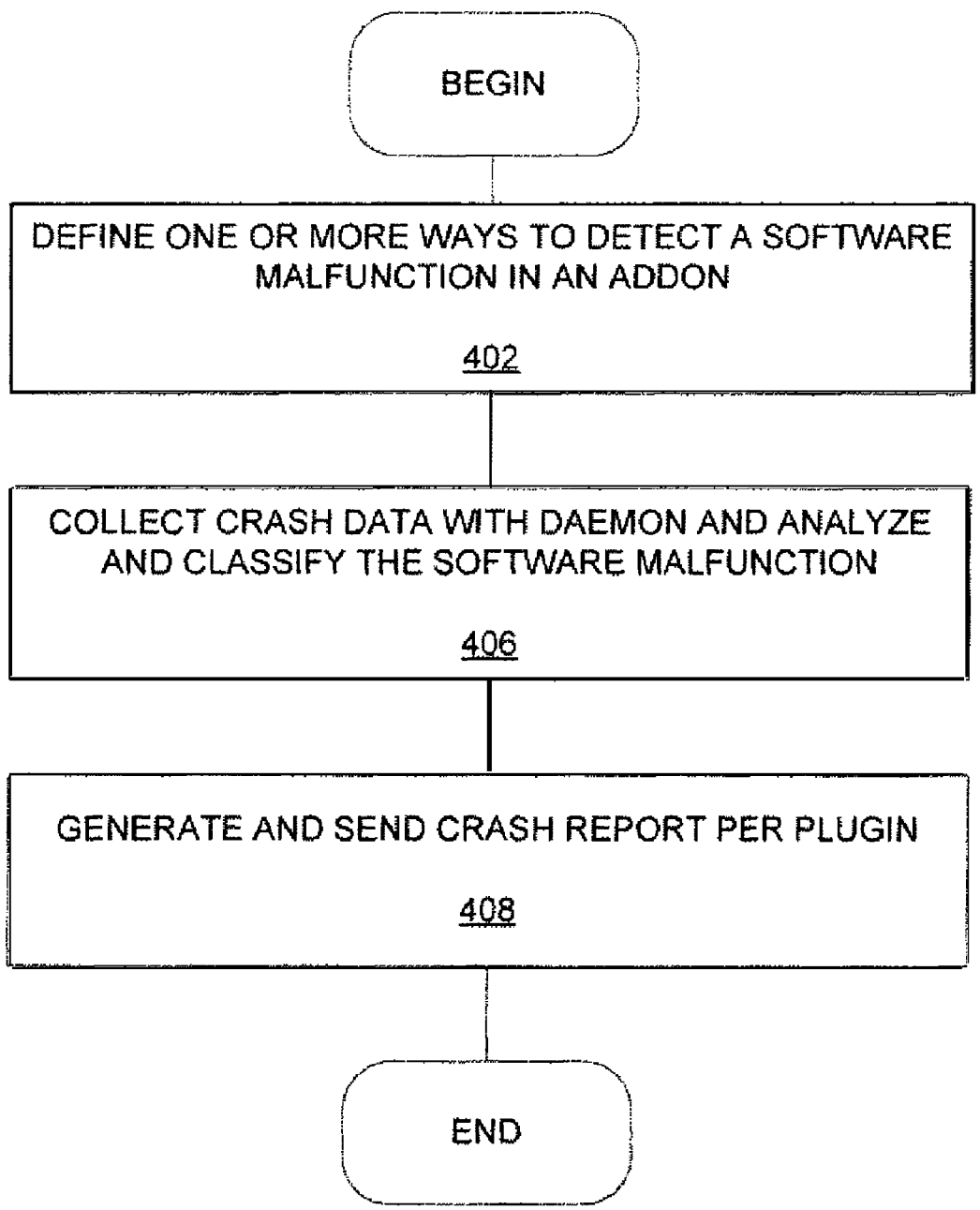
FIG. 4 is a flow diagram illustrating one embodiment of a method for detecting and reporting software malfunctions.

FIG. 4 is a flow diagram illustrating one embodiment of a method for detecting and reporting software malfunctions. At 402, one or more ways to detect a software malfunction is defined in an addon module. In one embodiment, at least one type of a software malfunction as defined in a configurable malfunction library at a client is detected. The configurable malfunction library can include at least one addon module that specifies how to detect the software malfunction. In one embodiment, the addon module includes an analyzer component, a hook component, an action component, and an addon setting component.

what and how to report the detected software malfunction is defined in a manner specified in a configurable reporting library corresponding to the type of software malfunction to at least one remote computer. The configurable reporting library can include at least one plugin module that specifies where and how to report the crash report.

In one embodiment, the plugin module includes a reporter component, a database component, and a plugin setting component.

At 406, data of the software malfunction is collected, analyzed and classified. a crash report is generated with at least one core component at the client. In one embodiment, the core component includes a core function component and a core component setting. The core function component can include at least one of a Graphical User Interface, an Applet, and a Daemon.

At 408, a crash report is generated and sent as specified in the plugin module.

Figure 5:
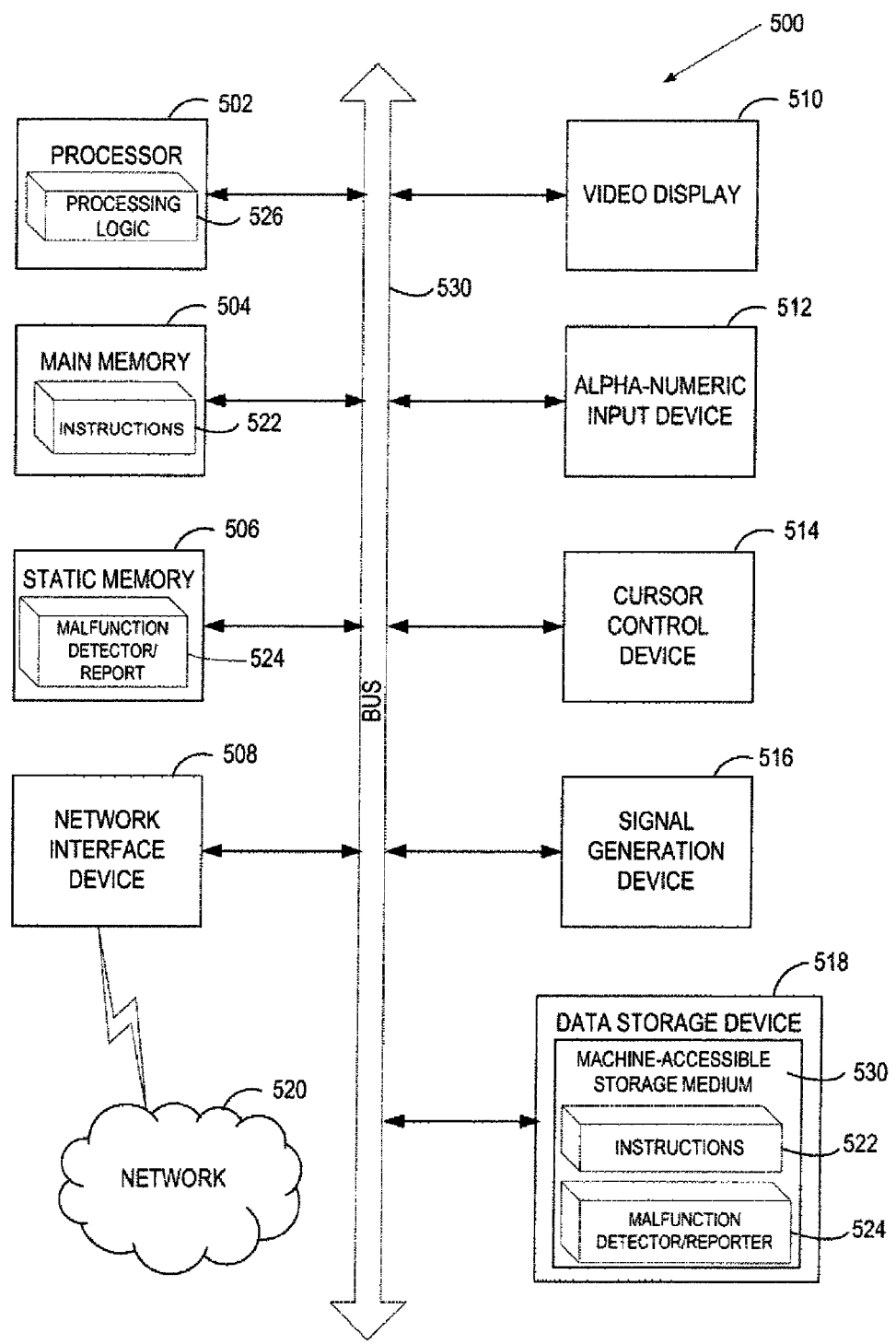
FIG. 5 is a block diagram illustrating an example of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute modules 526 (previously described with respect to FIG. 1) for performing the operations and steps discussed herein with. In one embodiment, the modules may be include hardware or software or a combination of both. In another embodiment, processing device 502 includes a pure function identifier module 528.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-accessible storage medium 530 on which is stored one or more sets of instructions (e.g., table generator software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting computer-accessible storage media. The software 522 may further be transmitted or received over a network 520 via the network interface device 508.

The computer-accessible storage medium 530 may also be used to store a malfunction detector/reporter 524 (also referred to as ABRT module) as presently described. The malfunction detector/reporter 524 may also be stored in other sections of computer system 500, such as static memory 506.

While the computer-accessible storage medium 530 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a software malfunction reporting tool executing on a client device separate from applications of the client device, crash data from at least one of a plurality of crash handlers of the client device, each of the plurality of crash handlers corresponding to one of an application or an operating system of the client device;
detecting, by the software malfunction reporting tool, a type of a software malfunction of the crash data, the type of software malfunction defined in a malfunction library of the software malfunction reporting tool, the malfunction library comprising a plurality of addon modules that each are dedicated to a software language of software applications executed on the client device and that each specify how to detect a malfunction in the software applications executed in the software language associated with the addon module;
determining, by the software malfunction reporting tool, a manner for reporting data of the software malfunction as defined in a reporting library of the software malfunction reporting tool, the reporting library comprising a plurality of plugin modules that correspond to types of software malfunctions and each comprise a reporter component defining a manner to report a type of software malfunction corresponding to the plugin module;
generating, by a core component of the software malfunction reporting tool, a crash report describing the data of the software malfunction, wherein the crash report is generated in the manner determined by the reporter component of the plugin module corresponding to the type of software malfunction; and
reporting, by the core component, the crash report in the manner specified by the reporter component of the plugin module corresponding to the type of software malfunction;
wherein the plurality of addon modules and the plurality of plugin modules are loaded as part of the software malfunction reporting tool upon an initialization of the software malfunction reporting tool on the client device, and wherein the core component is a compiled-in feature of the software malfunction reporting tool.

2. The method of claim 1 wherein the plurality of addon modules comprise at least one of a C/C++ application crashes catcher, a Linux™ kernel crashes catcher, a Python™ applications crashes catcher, or a Run Application Action.

3. The method of claim 1 wherein a core function component performs the generating the crash report.

4. The method of claim 3 wherein the core function component comprises at least one of a Graphical User Interface, an Applet, or a Daemon.

5. The method of claim 1 wherein the plugin module further comprises a database component.

6. A non-transitory computer-readable storage medium, having instructions stored therein, which when executed, cause a processing device to perform operations comprising:
receiving, by a software malfunction reporting tool executed by the processing device of a client device separate from applications of the client device, crash data from at least one of a plurality of crash handlers of the client device, each of the plurality of crash handlers corresponding to one of an application or an operating system of the client device;
detecting, by the software malfunction reporting tool, a type of a software malfunction of the crash data, the type of software malfunction defined in a malfunction library of the software malfunction reporting tool, the malfunction library comprising a plurality of addon modules that each are dedicated to a software language of software applications executed on the client device and that each specify how to detect a malfunction in the software applications executed in the software language associated with the addon module;
determining, by the software malfunction reporting tool, a manner for reporting data of the software malfunction as defined in a reporting library of the software malfunction reporting tool, the reporting library comprising a plurality of plugin modules that correspond to types of software malfunctions and each comprise a reporter component defining a manner to report a type of software malfunction corresponding to the plugin module;
generating, by a core component of the software malfunction reporting tool, a crash report describing the data of the software malfunction, wherein the crash report is generated in the manner determined by the reporter component of the plugin module corresponding to the type of software malfunction; and
reporting, by the core component, the crash report in the manner specified by the reporter component of the plugin module corresponding to the type of software malfunction;
wherein the plurality of addon modules and the plurality of plugin modules are loaded as part of the software malfunction reporting tool upon an initialization of the software malfunction reporting tool on the client device, and wherein the core component is a compiled-in feature of the software malfunction reporting tool.

7. The non-transitory computer-readable storage medium of claim 6 wherein the plurality of addon modules comprise at least one of a C/C++ application crashes catcher, a Linux™ kernel crashes catcher, a Python™ applications crashes catcher, or a Run Application Action.

8. The non-transitory computer-readable storage medium of claim 6 wherein a core function component performs the generating the crash report.

9. The non-transitory computer-readable storage medium of claim 8 wherein the core function component comprises at least one of a Graphical User Interface, an Applet, or a Daemon.

10. The non-transitory computer-readable storage medium of claim 6 wherein the plugin module further comprises a database component.

11. A computer system comprising:
a memory;
a processing device coupled to the memory;
a configurable malfunction reporting application programming interface (API) executable from the memory by the processing device, the configurable malfunction reporting API comprising:
a malfunction detector executing separate from applications of the computer system, the malfunction detector to:
receive crash data from at least one of a plurality of crash handlers of the client device, each of the plurality of crash handlers corresponding to one of an application or an operating system of the computer system; and
detect a type of software malfunction of the crash data, the type of software malfunction defined in a malfunction library, the malfunction library comprising a plurality of addon modules that each are dedicated to a software language of software applications executed on the client device and that each specify how to detect a malfunction in the software applications executed in the software language associated with the addon module;
a data collector coupled to the malfunction detector, the data collector comprising:
a plurality of plugin modules that correspond to types of software malfunctions and each comprise a reporter component defining a manner to report an associated type of software malfunction corresponding to the plugin module, wherein a plugin module of the plurality of plugin modules corresponding to the detected type of the software malfunction determines a manner for reporting data of the software malfunction according to the reporter component of the plugin module; and
a core component to generate a crash report describing the data of the software malfunction, wherein the crash report is generated in the manner determined by the reporter component of the plugin module corresponding to the type of software malfunction; and
a crash reporter coupled to the data collector, the crash reporter to report the crash report in the manner specified by the reporter component of the plugin module corresponding to the type of software malfunction;
wherein the plurality of addon modules and the plurality of plugin modules are loaded as part of the configurable malfunction reporting API upon an initialization of the configurable malfunction reporting API on the computer system, and wherein the core component is a compiled-in feature of the configurable malfunction reporting API.

12. The computer system of claim 11 wherein the plurality of addon modules comprise at least one of a C/C++ application crashes catcher, a Linux™ kernel crashes catcher, a Python™ applications crashes catcher, or a Run Application Action.

13. The computer system of claim 11 wherein the crash reporter comprises the core component.

14. The computer system of claim 13 wherein the core function component comprises at least one of a Graphical User Interface, an Applet, or a Daemon.

15. The computer system of claim 11 wherein the plugin module further comprising a database component.

* * * * *